No. 687,396. Patented Nov. 26, 1901.
G. A. & R. F. DUNN.
TRAVELING SPRAYING APPARATUS.
(Application filed May 13, 1901.)
(No Model.)
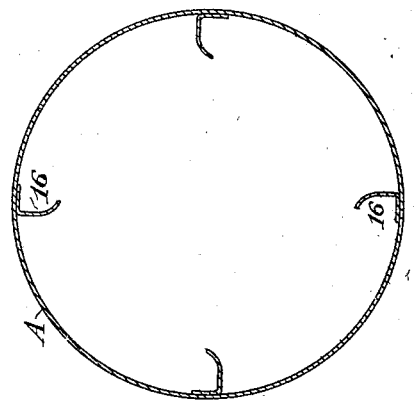
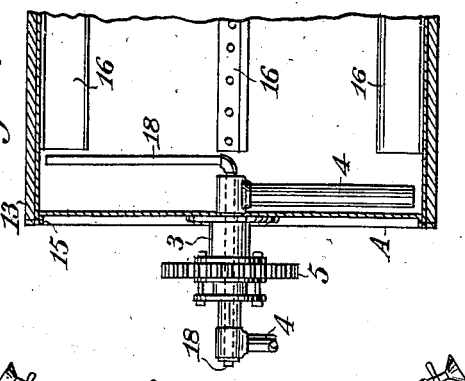
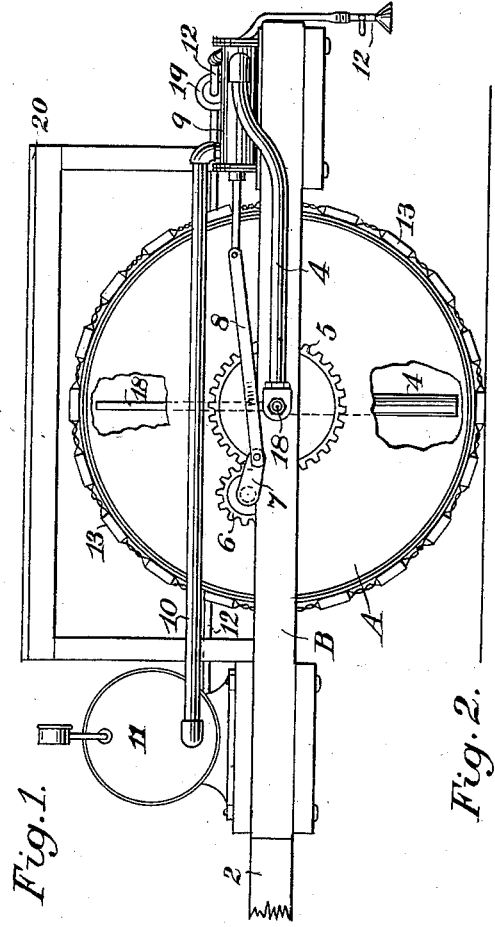
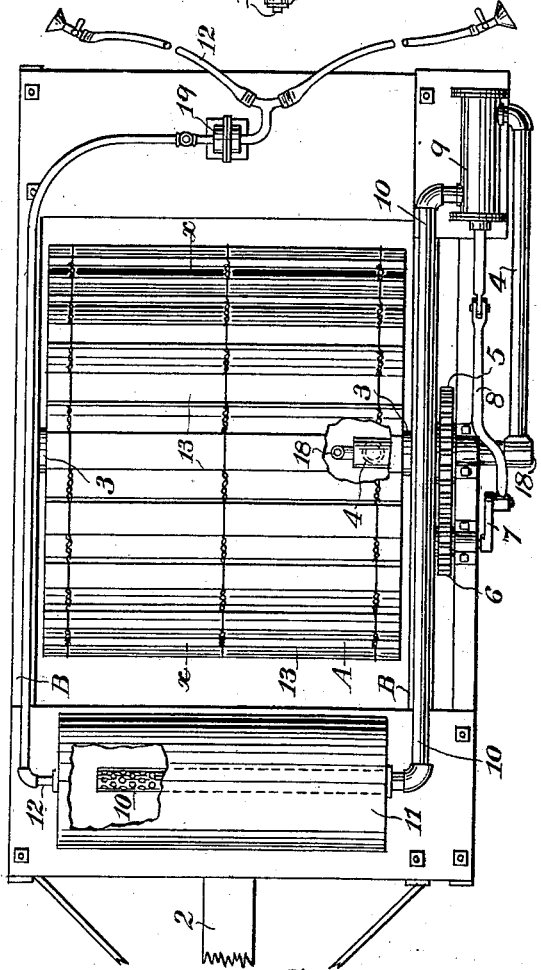
Witnesses,
Inventors,
George A. Dunn
Robert F. Dunn
Dewey Strong & Co.
Atty

UNITED STATES PATENT OFFICE.

GEORGE A. DUNN AND ROBERT F. DUNN, OF DINUBA, CALIFORNIA.

TRAVELING SPRAYING APPARATUS.

SPECIFICATION forming part of Letters Patent No. 687,396, dated November 26, 1901.

Application filed May 13, 1901. Serial No. 60,091. (No model.)

*To all whom it may concern:*

Be it known that we, GEORGE A. DUNN, a citizen of Canada, and ROBERT F. DUNN, a citizen of the United States, both residing at Dinuba, county of Tulare, State of California, have invented an Improvement in Traveling Spraying Apparatus; and we hereby declare the following to be a full, clear, and exact description of the same.

Our invention relates to an apparatus which is designed for the purpose of spraying trees and plants with mixtures or solutions which are designed to destroy insects and vermin and to otherwise improve the condition of the plants thus sprayed.

It consists of a hollow cylindrical roller journaled in a frame and adapted to contain the solution, pumps mounted upon the frame and connections by which the pumps are driven from the revolving containing-roller, suction-pipe connections between the pumps and the interior of the roller, agitators carried upon the interior of the roller and so constructed as to revolve therewith out of contact with the suction-pipe, and a removable corrugated jacket exterior to the drum, whereby a sufficient tractile power is given to the drum to drive the connected mechanism and to prevent its slipping on soft ground. In conjunction with this is a supplemental receiving-drum, into which the mixture is pumped under pressure and from which it is delivered through a suitable exterior filter to the spraying-pipes. A platform is mounted above the roller for the convenience of the operator.

The invention also comprises details of construction which will be more fully explained by reference to the accompanying drawings, in which—

Figure 1 is a side elevation of our apparatus. Fig. 2 is a plan, the top part being omitted. Fig. 3 is a transverse section of the drum, taken on the line *x x* of Fig. 2. Fig. 4 is a portion of a longitudinal section of the drum, taken through the axis.

A is a hollow cylindrical drum made of any suitable material, such as sheet-steel, or, if preferred, it may be made of wood and suitably hooped and strengthened. This drum is of sufficient size to contain a considerable quantity of any suitable material fit for spraying trees and plants. This material is usually prepared as a solution or mixture of some finely-pulverized material which will not entirely dissolve in the water with which it is mixed. Is is therefore necessary to keep it constantly agitated while passing through the apparatus to prevent the solid portions from settling. The drum A is journaled in a suitable frame B, to which is connected the pole or means for propelling or drawing the apparatus over the ground, as shown at 2. The journals 3 of the drum are tubular, and through the journal at one end enters the suction-pipe 4, which is bent or turned downward interior of the drum, so that its lower end is always very close to the bottom of the drum, and when suction is applied the material within the drum will be drawn out through this pipe. Upon the journal-shaft and turnable therewith is fixed a gear-wheel 5, and this gear meshes with a pinion 6, journaled upon the frame B and carrying the crank 7. The proportionate sizes of the gear and pinion are such as to provide for a sufficiently-rapid revolution of the crank, and by means of a pitman 8 connection is made with the plunger-rod of the force-pump 9. The pump may consist of one or more cylinders with equivalent connections, so as to provide a sufficient capacity for the work to be done.

The exterior portion of the suction-pipe 4 connects with the inlet or inlets of the pump or pumps, and the latter discharge through a pipe 10, which connects with a drum 11, located upon the frame B, so that all the liquid pumped from the drum A is delivered into the lower part of the drum 11, preferably from one end.

The discharge or spraying pipes 12 are suitably connected with the drum 11 and provided with controlling-cocks, which when opened will allow the liquid under pressure to be discharged, and by means of suitable nozzles it can be sprayed upon the trees or vines.

In order to provide a sufficient tractile force for the drum, which is usually drawn over the ground by a team of horses, it is necessary to prevent the drum from slipping on soft ground, which slipping would interfere with the proper driving of the gears and connected pumps; but when passing over hard ground or traveling from place to place on the road it is better to have the smooth surface of the drum exposed. We have therefore constructed a flexible jacket composed of bars or slats 13, connected together at suitable intervals by twisted wires or flexible chains, as at 14, and the jacket thus formed is of sufficient length to encircle the cylinder. The meeting ends of the jacket are secured together either by bolts passing through the two contiguous slats and nuts, by which they may be sufficiently tightened, or the flexible wires or connections may be attached to the outwardly-turned flanges 15 of the drum by means of holes therein or in other suitable way, so as to prevent the jacket from slipping upon the drum. Thus applied it enables the apparatus to be used upon very soft ground, where it would otherwise be ineffective, and the jacket is easily removed and rolled up whenever the apparatus is to travel upon the road or upon other smooth surface where power to drive the pumps is either sufficient or is not needed.

In order to constantly agitate the material while the drum is revolving, we have shown plates 16 bolted within the drum and projecting radially toward the center either straight or with a slight curvature, so that as the drum revolves they will lift and drop the material as they pass through it on the lower part of the drum, thus keeping it sufficiently agitated for the liquid to pass freely through the pump.

In order to allow the suction-pipe 4 to extend near enough to the bottom of the cylinder, we either cut away a portion of the blade 16 at the point where they coincide with the suction-pipe, as at 17, or the plates may terminate at this point, so that where they revolve with the cylinder they will not interfere with the suction-pipe.

Air is admitted to replace the liquid as it is withdrawn through the pipe 18, which passes through the center of the pipe 4 and the journal and is upturned, so that its upper end is close to the top of the cylinder, while the lower end of the suction-pipe is close to the bottom.

The joint where the pipe passes through into the suction-pipe is made suitably air and liquid tight, and the two ends of these pipes, one extending upwardly and the other downwardly, are located in approximately the same plane of rotation, so that the cut-away portion of the agitating-blade 16 coincides with the two pipes and leaves ample space for the pipes without interfering with the rotation of the agitators.

The liquid after being delivered into the pressure-chamber 11 is immediately withdrawn from the same; but in order to insure a proper agitation and prevent its settling during the little time in which it remains within the pressure-chamber we have shown the discharge-pipe 10 as entering the bottom of the chamber, and it may be perforated or otherwise so arranged that the discharge into the chamber will prevent the material from settling therein while the operation is going on.

It is desirable to provide a means for filtering the material before it passes into the spraying-pipes, so as to prevent clogging. We have therefore shown a filter located at 19. This filter may be any suitable screen clamped between rubber gaskets in a union coupling or otherwise suitably arranged for easy access.

The spraying-pipes may be conveniently led to a platform 20, which is built above the roller upon the main frame B, and thus serves for a convenient point for the operator while the machine is passing around the field.

Having thus described our invention, what we claim as new, and desire to secure by Letters Patent, is—

1. A spraying apparatus consisting of a hollow drum mounted in a frame having means for connecting the team or propelling mechanism, hollow journal-shafts connected with the drum, a suction-pipe extending axially through the journal-shaft turning downward, with its lower end in close proximity with the bottom of the drum, an air-pipe passing through the shaft having its inner end turned upwardly to the upper part of the drum, and radially-disposed agitating-plates fixed within the drum and cut away in their plane of rotation coincident with the air and suction pipes.

2. The combination in a spraying apparatus of a revoluble liquid-containing drum, having hollow journal-shafts, a frame upon which said shafts are journaled, means for attaching the team thereto, pumps carried upon the frame, gears revoluble with the drum-shaft, pinions engaged by said gears, crank-shafts to which the pinions are fixed, connections between the cranks and the pump-plungers, a suction pipe or pipes connecting the pumps with the interior and lower part of the drum, agitating-plates radially fixed within the drum and cut away in planes coincident with the location of the suction and air-inlet pipe.

3. The combination in a spraying apparatus of a revoluble drum, a frame in which it is journaled, means by which it is propelled over the ground, pumping mechanism carried thereon, and mechanism by which the pumps are driven from the drum-shaft, and a detachable corrugated jacket composed of transverse bars and intermediate flexible connections, and means for fixing it around the periphery of the drum.

4. A pumping and spraying apparatus consisting of a hollow containing drum, a frame in which it is journaled and means for propelling it over the ground, pumps carried upon the frame and driving connections with the drum, a suction pipe or pipes connecting the pumps with the interior of the drum, a supplemental drum mounted upon the frame, a pipe connecting the pumps with said supplemental drum whereby the liquid is delivered thereto under pressure and agitated therein, and discharge-pipes connecting said supplemental drum with the spray-nozzles.

5. The combination in a traveling spraying apparatus of a main frame, a hollow horizontal roller journaled and turnable therein, a platform located above the roller and supported from the main frame, a suction-pipe passing through a hollow trunnion of the drum and adapted to draw from the lower part of the interior of the drum, agitators for the contents of the drum adapted to operate without disturbing the suction-pipe, a pump with which the suction-pipe connects, a supplemental pressure-drum into which the pump discharges and flexible hose and a nozzle which may be carried on and operated from the platform.

In witness whereof we have hereunto set our hands.

GEORGE A. DUNN.
ROBERT F. DUNN.

Witnesses:
S. H. NOURSE,
JESSIE C. BRODIE.